United States Patent Office 3,291,825
Patented Dec. 13, 1966

3,291,825
METHOD OF MAKING DIPHENIC ACID
Nicholas P. Greco, Pittsburgh, Pa., assignor to Koppers Company, Inc., a corporation of Delaware
No Drawing. Filed Mar. 27, 1963, Ser. No. 268,468
9 Claims. (Cl. 260—523)

This invention relates to a method of making diphenic acid. In one specific aspect, it relates to a method of making diphenic acid by the oxidation of the ozonation product of phenanthrene.

Diphenic acid is useful for a wide variety of purposes. It has marked utility in the preparation of synthetic resins, plasticizers for synthetic resin, and fibers. Bruson, in U.S. Patent 1,815,866, describes resins made from diphenic acid as being particularly suitable as coating compositions, lacquers, and varnishes because of their unusual flexibility, adhesion, and waterproof quality. Diphenic acid may also be used as an intermediate in the preparation of plasticizers and in the form of its anhydride for the preparation of polyamides and polyesters.

Heretofore, Bailey, J.A.C.S. 78, 3811 (1956), ozonized phenanthrene in anhydrous methyl alcohol solution at temperatures between 0 and −60° C. He then hydrolyzed the ozonation product in the presence of hydrogen peroxide and caustic to obtain a 65 percent overall yield of diphenic acid. Other methods of hydrolyzing the ozonation product of phenanthrene are described by O'Conner, Schmitt, and Moroconi, Ind. Eng. Chem. 49, 1701 (1957), using ozone-oxygen and catalytic amounts of sodium acetate and vanadium penthoxide, whereby impure diphenic acid contaminated with diphenaldihydic acid was obtained in yields of 50–51 percent from technical phenanthrene and 56 percent from pure phenanthrene. However, they reported that attempts to hydrolyze the ozonation product of phenanthrene with potassium hypochlorite at a temperature of 55° C. was completely unsuccessful.

Quite surprisingly, I have discovered that when an alcoholic solution of the ozonation product of phenanthrene is oxidized with an alkali metal hypohalite in aqueous solution, essentially quantitative yields of high purity diphenic acid are obtained.

It is, therefore, an object of the present invention to prepare high yields of diphenic acid from the ozonation product of phenanthrene using an alkali metal hypohalite as an oxidizing agent.

It is a further object of the present invention to prepare diphenic acid from the ozonation product of phenanthrene using an alkali metal hypohalite in the presence of a Group VIII metal oxide catalyst.

In accordance with the present invention, I have discovered a new method of making diphenic acid from the ozonation product of phenanthrene obtained by reacting phenanthrene with ozone in a mixture consisting essentially of water and aliphatic alcohol having up to eight carbon atoms by reacting the ozonation product with an oxidizing agent of the formula:

MOX wherein M is an alkali metal and X is a member selected from the group consisting of chlorine and bromine, by adding the ozonation product to an aqueous solution of the oxidizing agent having a pH of at least 13, at a temperature up to the reflux temperature of the reaction mixture to form the alkali metal diphenate. The alkali metal diphenate is then hydrolyzed in the presence of a strong acid and the diphenic acid is recovered.

Further, I have discovered that my new method may be conveniently carried out by reacting the ozonation product of phenanthrene with the oxidizing agent set forth above in the presence of a catalytic amount of a Group VIII metal oxide catalyst.

The ozonation product of phenanthrene used as a starting material in my invention may be prepared from pure phenanthrene or technical grade phenanthrene according to the method of Sturrock et al., U.S. patent application Serial No. 49,929, filed August 16, 1960, now issued patent U.S. 3,091,620. According to this method, phenanthrene is suspended in a mixture of water and an organic solubilizing agent capable of bringing the reactants together in a single reactive liquid phase and is contacted with a gas stream containing ozone to make a peroxidic ozonation product. Useful solvents for the ozonation reaction are mixtures of water and aliphatic alcohols having up to eight carbon atoms. Preferably, the alcohols useful as solubilizing agents form an azeotropic mixture with water which boils well below the boiling point of water at certain fixed weight percent concentrations. For example, the azeotropic mixture of ethanol-water system is formed at concentrations of 95 percent ethanol and 5 percent water. For the tertiary butyl alcohol-water system, the azeotropic mixture comprises 88 percent tertiary butyl alcohol and 12 percent water. Other ratios of water to alcohol are also useful.

The ozonation products, preferably obtained in aqueous alcoholic solution by a method such as that of Sturrock et al. described hereabove, are oxidatively decomposed according to my invention in an aqueous solution of an oxidizing agent having the formula:

MOX wherein M is an alkali metal; e.g. sodium, potassium, and lithium, and X is chlorine or bromine. The alkali metal hypohalites may be used as anhydrides or in any of the hydrated forms. Sodium hypohalites are preferred over the more expensive potassium and lithium compounds. The oxidizing agents are effective in about a 5–23 percent aqueous solution. While more dilute solutions may be used, they are undesirable because they unnecessarily increase the volume of the reaction medium, making it necessary to use equipment of greater capacity. Solutions greater than 23 percent are unstable, especially in the presence of the metal oxide catalyst at the reaction temperatures.

The reaction is conveniently performed in the presence of Group VIII metal oxide catalysts formed by the addition to the reaction medium of their water-soluble salts, including nickel salts; e.g. nickel acetate, nickel bromide, nickel chloride, nickel nitrate, nickel sulfate, and the hydrated forms thereof; cobalt salts; e.g. cobaltic acetate, cobaltous bromide, cobaltic bromide, cobaltous chlorate, cobaltous chloride, cobaltic chloride, cobaltic hydroxide, cobaltous iodide, cobaltic iodide, cobaltous nitrate, cobaltous sulfate, and the hydrated forms thereof; and iron salts; e.g. ferrous acetate, ferric acetate, ferrous bromide, ferric bromide, ferrous chloride, ferric chloride, ferric formate, ferrous iodide, ferric iodide, ferric malate, ferrous nitrate, ferric nitrate, ferrous sulfate, and the hydrated forms thereof. Useful amounts of Group VIII metal oxides are in a range of 0.5–3.0 percent by weight of Group VIII metal based on the weight of phenanthrene subjected to ozonation. Using less than 0.5 percent at room temperature significantly decreases the efficiency of the reaction; whereas using more than 3.0 percent, while not decreasing the efficiency, is uneconomical.

It is necessary in preparing diphenic acid according to the present invention that the oxidizing medium be highly basic, such that the pH of the solution remains at least above 13, and preferably between pH 13–14. The alkalinity of the solution is maintained by the addition of a base, such as sodium hydroxide or potassium hydroxide, in an amount of at least two moles of caustic per mole of phenanthrene ozonate, and preferably in about a five percent excess of the required amount.

In order to obtain satisfactory results, a temperature of about 20° to the reflux temperature of the reaction medium after the alcohol has been distilled off (ca. 105° C.) is required in the absence of a catalyst. However, in the presence of the catalyst, lower temperatures ranging from 20-50° C. are sufficient. During the initial stages of the reaction, it may be necessary to control the exotherm by placing the reactor in a cooling bath.

The reaction is generally run at atmospheric pressure. It is undesirable to use superatmospheric pressure, since the reaction involves the liberation of gaseous oxygen. No advantage is seen in using subatmospheric pressure.

The order of addition of the ozonation product of phenanthrene to the aqueous solution of the alkali metal hypohalite is critical. The ozonation product must be added gradually to the solution of the oxidizing agent. Reversing the order of addition, such that the aqueous solution of the oxidizing agent is added to the ozonation product, results merely in the formation of an oily substance from which diphenic acid cannot readily be recovered.

Diphenic acid is recovered from the alkali metal diphenate by conventional hydrolysis; i.e. heating an aqueous solution of the alkali metal diphenate in the presence of a strong mineral acid, such as sulfuric acid or hydrochloric acid. The precipitate formed is then washed and dried to give high purity, colorless diphenic acid, M.P. 233–234° C.

Although better results are obtained when the initial ozonation product is prepared from pure phenanthrene, excellent results are obtained from technical grade phenanthrene (90% phenanthrene, 5% anthracene and 5% undetermined). It is particularly advantageous to conduct the oxidation reaction of the ozonation product prepared from technical grade phenanthrene in the presence of an alcohol, e.g. t-butyl alcohol. In addition to serving as part of the reaction medium, the alcohol salts out as a separate organic phase which is highly effective in removing from the alkali metal diphenate organic impurities insoluble in the aqueous phase.

My invention is further illustrated by the following examples:

EXAMPLE I

Technical phenanthrene (180 g.; 0.91 mole; 90% phenanthrene, 5% anthracene and 5% undetermined) was heated until dissolved in t-butyl alcohol (1920 ml.). Cold water (480 ml.) was then added with rapid stirring. The finely suspended solid was ozonized at 25–28° C. with 2% ozone until 1.30 moles of ozone were absorbed. The alkaline sodium hypochlorite oxidizing mixture was made by adding chloride (213 g.; 3 moles) to sodium hydroxide (424 g., 10.6 moles) in water (1500 ml.) at 0–5° C. to which was added nickel chloride hexahydrate (10 g. dissolved in 50 ml. H₂O). The ozonate was added to the oxidizing mixture with stirring at 20° C. (exotherm and oxygen evolution) in four minutes. The oxidation mixture was held at 20–25° C. for three hours, after which the heavy black nickel oxides were allowed to settle out. The upper t-butyl alcohol was decanted from the lower alkaline aqueous solution of sodium diphenate.

The cycle was repeated with the spent catalyst and more ozonate was made from technical phenanthrene (162 g., 0.81 mole of phenanthrene). Before the addition of ozonate, sodium hypochlorite made from chlorine (192 g., 2.71 moles) and sodium hydroxide (382 g., 9.6 moles) dissolved in water (1340 ml.) at 0–5° C. was added to the rapidly stirred spent catalyst from the first cycle. The reaction conditions were the same as in the first cycle.

The oxidation mixture was filtered to recover anthraquinone and the nickel catalyst (in the form of nickel oxides). The aqueous alkaline filtrate was separated from the t-butyl alcohol in a separatory funnel. The aqueous solution was heated to boiling to distill off dissolved alcohol and acidified while hot with sulfuric acid (770 g., 50% conc.) to a pH of 2. The white diphenic acid was collected on a centrifuge and washed with water (4 liters) until free of sodium chloride and sodium sulfate to give 381 g. (91% yield) of diphenic acid, M.P. 233–234° C.; neut. equiv. 121. Theory, M.P. 234° C.; neut. equiv. 121.

The t-butyl alcohol layer was distilled and 37 g. of solid residue was obtained. From this residue 4.1 g. of diphenic acid and 7.1 g. of 9,10-anthraquinone were isolated. Extraction of the filtered nickel catalyst with boiling xylene gave an additional 7.0 g. of 9,10-anthraquinone.

EXAMPLE II

Following the procedure of Example I, except that the ratios of hypochlorite and caustic were varied, the following experiments were conducted to determine optimum conditions. Maximum yields of diphenic acid were produced at phenantherene ozonate-sodium hypochlorite molar ratios of 3:1 when a large excess of sodium hydroxide was used. At molar ratios of 4:1, a smaller excess was needed. The data is shown in Table I.

*Table I*

OXIDATION OF THE OZONATE FROM TECHNICAL PHENANTHRENE

| Moles of Phenanthrene [1] Charged to Ozonizer | Moles of Sodium Hypochlorite | Moles of NaOH | Yield of Diphenic Acid (Percent) |
|---|---|---|---|
| 0.91 | 4 | 4.6 | 90 |
| 0.91 | 4 | 2.6 | 90 |
| 0.91 | 3 | 4.6 | 90 |
| 0.91 | 3 | 2.2 | 60 |

[1] Phenanthrene-anthracene ozonized contained approximately 90% phenanthrene and 5% anthracene. The anthracene ozonate also requires hypochlorite to oxidize it to anthraquinone. On the basis of the foregoing composition the total theoretical requirement of sodium hypochlorite would be two moles per mole of phenanthrene-anthracene fraction.

EXAMPLE III

Phenantherene (17.8 g., 0.1 mole, 99% purity) was heated to boiling in t-butyl alcohol (400 ml.) and water (200 ml.) and stirred until cool. The finely divided phenanthrene was ozonated at room temperature until 0.94 mole of ozone was absorbed. The active oxygen of the ozonized solution (550 ml.) assayed 98.5% of theory. To an aliquot of the ozonate (100 ml., 0.018 mole) was added a 15% sodium hypochlorite solution (200 ml., 0.40 mole) containing NaOH (10 g. 0.25 mole) over a period of eight minutes. Chlorine was liberated during the first part of the addition and a brown oil was obtained which changed to light yellow upon completion of the addition. The reaction mixture was boiled for six hours after distilling off the t-butyl alcohol. Acidification of the alkaline solution gave an oil (unidentified) which failed to crystallize.

EXAMPLE IV

The obonate (136 ml., 0.05 mole in t-butyl alcohol solution) was fed dropwise in four minutes to rapidly stirred solution hydroxide (8 g., 0.2 mole) dissolved in sodium hypochlorite (15% soln., 166 ml., 0.25 mole). The reaction temperature rose from room temperature to 45° C. with oxygen evolution. The mixture was immediately heated to distill off t-butyl alcohol-water azeotrope and the heating contained to 105° C. pot temperature for six hours. Crystals of anthraquinone formed after the t-butyl alcohol was distilled off. The solution was cooled to 25° C. and filtered to collect anthraquinone. The aqueous filtrate was acidified with sulfuric acid to precipitate diphenic acid. At a 4:1 molar ratio of sodium hypochlorite to ozonate the yield of diphenic acid was 69%, at a 5:1 molar ratio of sodium hypochlorite to ozonate, the yield of diphenic acid was 92%.

EXAMPLE V

Following the procedure of Example I, substituting cobaltous chloride and ferric chloride for nickel chloride hexahydrate, diphenic acid of high purity and satisfactory yields is obtained.

I claim:

1. A method of making diphenic acid from the ozonation product of phenanthrene obtained by reacting phenanthrene with ozone in a mixture consisting essentially of 5–80% by weight water and 20–95% by weight of a saturated aliphatic alcohol having from two to eight carbon atoms comprising reacting at a temperature up to the reflux temperature of the reaction mixture in an aqueous solution having a pH of at least 13 said ozonation product with an oxidizing agent of the formula

MOX wherein M is an alkali metal and X is a member selected from the group consisting of chlorine and bromine, by adding said ozonation product to an aqueous solution of said oxidizing agent and allowing the mixture to react to form the alkali metal diphenate, hydrolyzing said alkali metal diphenate in the presence of a strong mineral acid, and recovering diphenic acid.

2. A method of making diphenic acid from the ozonation product of phenanthrene obtained by reacting phenanthrene with ozone in a mixture consisting essentially of 5–80% by weight water and 20–95% by weight of a saturated aliphatic alcohol having from two to eight carbon atoms comprising reacting at a temperature up to the reflux temperature of the reaction mixture in an aqueous solution having a pH of at least 13, said ozonation product with sodium hypochlorite by adding said ozonation product in said solvent mixture to an aqueous solution of sodium hypochlorite and allowing the mixture to react to form the sodium diphenate, hydrolyzing said sodium diphenate in the presence of a strong mineral acid and recovering diphenic acid.

3. A method of making diphenic acid from the ozonation product of phenanthrene obtained in aqueous alcoholic solution by reacting phenanthrene with ozone in a mixture consisting essentially of 5–80% by weight water and 20–95% by weight of a saturated aliphatic alcohol having from two to eight carbon atoms comprising reacting at a temperature of 20–50° C. in an aqueous solution having a pH of at least 13, said ozonation product in said solution with an oxidizing agent of the formula

MOX wherein M is an alkali metal and X is a member selected from the group consisting of chlorine and bromine, by adding said ozonation product to an aqueous solution of said oxidizing agent in the presence of a catalytic amount of a Group VIII metal oxide, said Group VIII metal selected from the group consisting of nickel, cobalt, and iron, and allowing the mixture to react to form the alkali metal diphenate, hydrolyzing said alkali metal diphenate in the presence of a strong mineral acid and recovering diphenic acid.

4. A method according to claim 3 wherein said metal oxide is formed in situ by the addition to the reaction mixture of a water-soluble salt of a Group VIII metal selected from the group consisting of nickel, cobalt and iron.

5. A method of making diphenic acid from the ozonation product of phenanthrene obtained by reacting phenanthrene with ozone in a mixture consisting essentially of water and tertiary butyl alcohol comprising reacting at a temperature of 20–50° C. in an aqueous solution having a pH of at least 13, said ozonation product with sodium hyprochlorite by adding said ozonation product in said solvent mixture to a 5–23 percent by weight aqueous solution of sodium hyprochlorite in the presence of a catalytic amount of a nickel oxide catalyst and allowing the mixture to react to form sodium diphenate, hydrolyzing said sodium diphenate in the presence of a strong mineral acid and recovering diphenic acid.

6. A method according to claim 5 wherein said catalyst is formed in situ by the addition of a water-soluble nickel salt.

7. A method of making a dialkali metal diphenate from the ozonation product of phenanthrene obtained by reacting phenanthrene with ozone in a mixture consisting essentially of 5–80% by weight water and 20–95% by weight of a saturated aliphatic alcohol having from two to eight carbon atoms comprising reacting at a temperature up to the reflux temperature of the reaction mixture in an aqueous solution having a pH of at least 13, said ozonation product with an oxidizing agent of the formula

MOX wherein M is an alkali metal and X is a member selected from the group consisting of chlorine and bromine, by adding said ozonation product in said solvent mixture to an aqueous solution of said oxidizing agent and recovering the dialkali metal diphenate.

8. A method according to claim 7 wherein said alkali metal is sodium and said oxidizing agent is sodium hypochlorite.

9. A method of making disodium diphenate from the ozonation product of phenanthrene obtained by reacting phenanthrene with ozone in a mixture consisting essentially of 5–80% by weight water and 20–95% by weight of a saturated aliphatic alcohol having from two to eight carbon atoms comprising reacting at a temperature of 20–50° C. in an aqueous solution having a pH of at least 13, said ozonation product with sodium hypochlorite by adding said ozonation product in said solvent mixture to a 5–23 percent by weight aqueous solution of sodium hypochlorite in the presence of a catalytic amount of a nickel oxide and recovering the disodium dihpenate.

References Cited by the Examiner

FOREIGN PATENTS 786,561  11/1957  Great Britain.
853,112  11/1960  Great Britain.

LORRAINE A. WEINBERGER, *Primary Examiner.*

T. L. GALLOWAY, *Assistant Examiner.*